United States Patent
Lee

(10) Patent No.: US 10,616,388 B1
(45) Date of Patent: Apr. 7, 2020

(54) DETACHABLE FINGER GRIP FOR A MOBILE ELECTRONIC DEVICE

(71) Applicant: Ryan Lee, Sandusky, OH (US)

(72) Inventor: Ryan Lee, Sandusky, OH (US)

( * ) Notice: Subject to any disclaimer, the term of this patent is extended or adjusted under 35 U.S.C. 154(b) by 0 days.

(21) Appl. No.: 16/385,839

(22) Filed: Apr. 16, 2019

(51) Int. Cl.
| | |
|---|---|
| *H04M 1/04* | (2006.01) |
| *F16B 5/00* | (2006.01) |
| *A45C 11/00* | (2006.01) |
| *G06F 1/16* | (2006.01) |

(52) U.S. Cl.
CPC .............. *H04M 1/04* (2013.01); *A45C 11/00* (2013.01); *F16B 5/00* (2013.01); *G06F 1/1632* (2013.01); *A45C 2011/002* (2013.01); *A45C 2011/003* (2013.01)

(58) Field of Classification Search
CPC combination set(s) only.
See application file for complete search history.

(56) References Cited

U.S. PATENT DOCUMENTS

| | | | |
|---|---|---|---|
| 5,070,563 A | * | 12/1991 | Tervola ................ A44C 5/0046 294/25 |
| 7,324,156 B2 | | 1/2008 | Lohr et al. |
| D647,085 S | | 10/2011 | Chung et al. |
| 8,560,031 B2 | | 10/2013 | Barnett et al. |
| D711,866 S | | 8/2014 | Kawata |
| D719,951 S | | 12/2014 | Fenton |
| D777,154 S | | 1/2017 | McGowan et al. |
| 9,800,703 B2 | | 10/2017 | Roux |
| D809,449 S | * | 2/2018 | Zhang ......................... D12/415 |
| 10,019,034 B2 | | 7/2018 | Hobbs et al. |
| 10,030,807 B1 | | 7/2018 | Hobbs et al. |
| 2008/0083797 A1 | * | 4/2008 | Myers .................... A45C 13/20 224/217 |
| 2009/0283559 A1 | | 11/2009 | Foggiato |
| 2011/0084081 A1 | | 4/2011 | Chung et al. |
| 2012/0031937 A1 | | 2/2012 | Baker |
| 2014/0124388 A1 | | 5/2014 | McGowan et al. |
| 2014/0335922 A1 | * | 11/2014 | West .................... A44C 9/0061 455/575.6 |
| 2015/0175309 A1 | | 1/2015 | McGowan et al. |
| 2015/0122852 A1 | * | 5/2015 | Feng ........................ A45F 5/00 224/191 |

(Continued)

FOREIGN PATENT DOCUMENTS

| | | | | |
|---|---|---|---|---|
| CN | 205921631 U | | 2/2017 | |
| DE | 2015-54963 B | * | 9/2015 | ............. H04M 1/11 |
| EP | 3373566 B1 | | 3/2019 | |

(Continued)

OTHER PUBLICATIONS

Aple iPhone6—Magnetic Ring Grip Finger Holder Case Navy Blue. https://www.amazon.com/goStrap-Protector-including-Android-Tablets/dp/B0112W2PU2?ref_=fsclp_pl_dp_1.

(Continued)

*Primary Examiner* — Junpeng Chen
(74) *Attorney, Agent, or Firm* — Dominic A. Frisina

(57) ABSTRACT

A grip for a mobile electronic device is provided. The grip includes a band suitable for being gripped or otherwise receiving one or more fingers. The band includes a base section having a magnetic member attached thereto or embedded therein. Optionally, the grip may further include a countermember co-operably opposable with the magnetic member.

2 Claims, 9 Drawing Sheets

(56) References Cited

U.S. PATENT DOCUMENTS

2016/0220000 A1    8/2016  McGuckin
2019/0090621 A1*   3/2019  Yoo ........................... A45F 5/10

FOREIGN PATENT DOCUMENTS

WO    2018187278 A1    10/2018
WO    2018222612 A1    12/2018

OTHER PUBLICATIONS

Phone Ring Holder Cell Phone Holder Universal Finger Ring Stand with Magnetic Car Mount Phone Holder for Car Air Vent Magnetic Mount car Phone Holder 21n1 Set(Rose Gold). https://www.amazon.com/dp/B07MYXZWXL/ref=sspa_dk_detail_2?bsc=1&pd_rd_i=B07MYXZWXL&pd_rd_w=KadbO&pf_rd_p=733540df-430d-45cd-9525-21bc15b0e6cc&pd_rd_wg=MIOb0&pf_rd_r=W0J077B28XS7ENHZ8J68&pd_rd_r=bbb7dc7a-45ca-11e9-a0f6-eb01d7bf9839.

Get-A-Grip. https://www.potterybarn.com/products/get-a-grip-smartphone-finger-loop/?catalogId=84&sku=3775097&cm_ven=PLA&cm_cat=Google&cm_pla=Organization%20%3E%20Travel%20Accessories&cm_ite=3775097&gclid=CjwKCAjw1KLkBRBZEiwARzyE7y42gHGzFe-3OsEH6wnopkTJn_jRm-Udn7gMU2hv15tX7qwbhuhKzhoCms4QAvD_BwE.

Luxury Glitter Gel TPU Case. http://vi.raptor.ebaydesc.com/ws/eBayISAPI.dll?ViewItemDescV4&item=323388366579&category=20349&pm=1&ds=0&t=1552288629000&ver=0.

* cited by examiner

DETACHABLE FINGER GRIP FOR A MOBILE ELECTRONIC DEVICE

I. BACKGROUND OF THE INVENTION

A. Field of Invention

The invention generally relates to the field of mobile device holders.

B. Description of the Related Art

Mobile electronic devices, such as cellular phones and tablet computers, are intended to be hand-held; however, gripping such devices can be cumbersome. For instance, tablet computers and even some cellphones are too large to be easily gripped in the palm of one hand. Holding such devices can be particularly difficult for people with small hands, e.g. children, or when the user's hands are also occupied with other objects. Accordingly, a variety of devices have been provided to assist users in holding their mobile devices.

One solution has been to provide a finger ring integral with a cellphone case. Though providing a gripping means, this solution leaves no flexibility to user to decide where the ring should be placed. Variations of this solution include a fixed ring disposed on the side of a cellphone case, while another integrates a pair of opposing rings designed to cooperate with the user's index fingers. Still another solution places an integral hinged ring on the back of a cellphone case, where the hinge is attached to a magnetic ring in a fixed position relative to the cellphone case. Thus, the magnet biases the hinged ring toward a stowed configuration, where the ring folds flat against the cellphone case when the user is not actively engaging it. Different people will have different gripping preferences, but an integral ring locks the user into a particular configuration.

Another known solution is to provide a finger-engaging member that is bondable to a mobile device or a case therefor. For instance, it is known to adhesively bond such structures to cellphone cases. Bondable solutions provide the user with flexibility with regard to placement of the finger-engaging member, but generally the users placement choice is not easily reversible. Even in cases where pressure sensitive adhesives are used to bond the finger-engaging member, removing and repositioning it tends to leave adhesive residue which can attract dirt. Moreover, adhesives are inherently limited in the number of times they can be removed and repositioned before they lose their bond strength. For instance, repositioning a pressure sensitive adhesive strip on a dirty surface will rapidly fill the surface with interfering particles, thus degrading adhesive strength.

Certain magnetic holders for mobile devices are also known. For instance, it is known to bond a paramagnetic metal member to a mobile device or device case, which cooperates with a permanent magnet, e.g. mounted to an air vent of a car. In one such device the paramagnetic member includes a hinged ring. Thus, in a hand-held use case a user can engage the ring with his finger, and in a car-mounted use case the paramagnetic member can engage the permanent magnet.

Some embodiments of the present invention may provide one or more benefits or advantages over the prior art.

II. SUMMARY OF THE INVENTION

Some embodiments may relate to a finger grip for a mobile electronic device. The finger grip may comprise a band configured to receive at least one adult human finger; a base section of the band, having a generally flat shape; and a first permanent magnet member being axially magnetized and affixed to the base section of the band.

Embodiments may further comprise a generally planar countermember mechanically free from the band and from the first permanent magnet, wherein the countermember is either paramagnetic or ferromagnetic and co-operably opposable with the first permanent magnet.

According to some embodiments the countermember is generally planar and axially magnetized, and comprises a first major face having a pressure sensitive adhesive layer, and a second major face opposed to the first major face and having a magnetic pole attractive to a magnetic pole of a second major face of the first permanent magnet.

Embodiments may further comprise a mobile electronics case, wherein the countermember is embedded in the mobile electronics case.

According to some embodiments the band comprises a first finger opening having a fixed size selected to receive no more than one, two, three, or four fingers of a human hand.

Embodiments may further comprise a second finger opening having a fixed size selected to receive no more than one, two, three, or four fingers of a human hand.

According to some embodiments the band is a rigid loop, a semi-rigid loop, or a flexible loop.

According to some embodiments the band is a flexible loop having a closure.

According to some embodiments the base section further comprises a recess to receive the first permanent magnet.

Embodiments may further comprise a stand, the stand comprising: a bottom section having a generally flat shape; and a top section having a stand recess complementary to a portion of the band such that the recess receives the band in a fixed orientation.

According to some embodiments the stand recess includes a paramagnetic member magnetically communicable with the first permanent magnet member.

According to some embodiments the stand recess is sized to receive the portion of the band in a transition fit.

According to some embodiments the base section and the first permanent magnet share a common coating.

According to some embodiments the common coating is selected from one or more of electroplating, a paint, an enamel, or a rubber.

According to some embodiments the band is a flexible band and the first permanent magnet defines a major face having a curvature, said major face being bonded to the flexible band.

Other benefits and advantages will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof, wherein like reference numerals indicate like structure, and wherein.

IV. DETAILED DESCRIPTION OF THE INVENTION

As used herein the terms "embodiment", "embodiments", "some embodiments", "other embodiments" and so on are not exclusive of one another. Except where there is an explicit statement to the contrary, all descriptions of the features and elements of the various embodiments disclosed herein may be combined in all operable combinations thereof.

Language used herein to describe process steps may include words such as "then" which suggest an order of operations; however, one skilled in the art will appreciate that the use of such terms is often a matter of convenience and does not necessarily limit the process being described to a particular order of steps.

Conjunctions and combinations of conjunctions (e.g. "and/or") are used herein when reciting elements and characteristics of embodiments; however, unless specifically stated to the contrary or required by context, "and", "or" and "and/or" are interchangeable and do not necessarily require every element of a list or only one element of a list to the exclusion of others.

Terms of degree, terms of approximation, and/or subjective terms may be used herein to describe certain features or elements of the invention. In each case sufficient disclosure is provided to inform the person having ordinary skill in the art in accordance with the written description requirement and the definiteness requirement of 35 U.S.C. 112.

Figure 1:
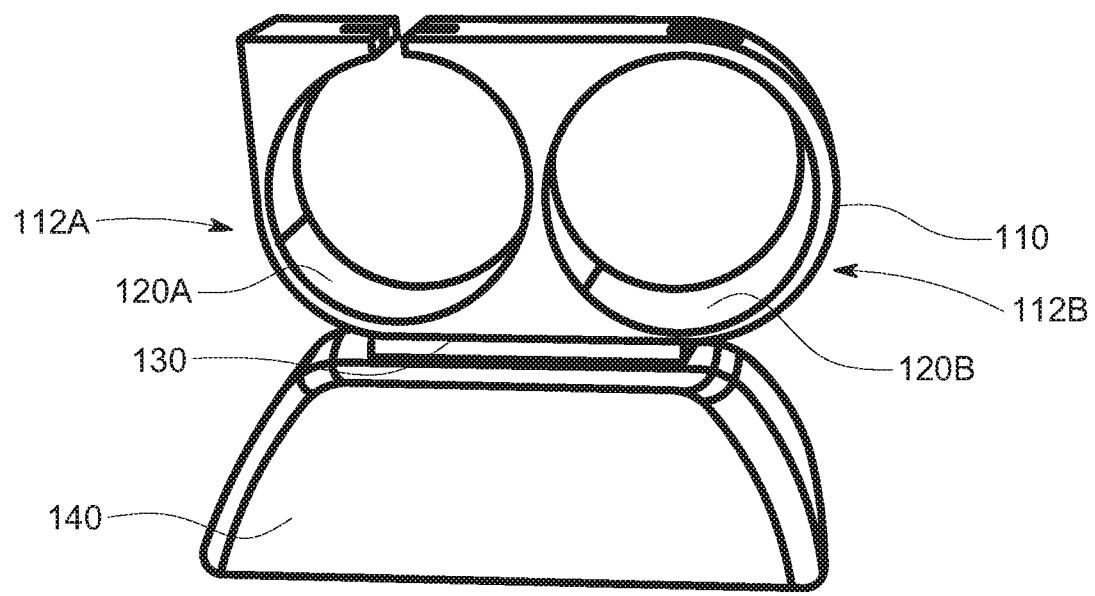
FIG. 1 is a perspective view of a band and stand according to an embodiment of the invention.

Referring now to the drawings wherein the showings are for purposes of illustrating embodiments of the invention only and not for purposes of limiting the same, FIG. 1 is a perspective view of a band 110 stowed in a stand 140. According to this embodiment, the band 110 is configured to receive two adult human fingers by including a first finger opening 120A and a second finger opening 120B. The size of each finger opening of this embodiment is fixed and selected to receive no more than one adult human finger. The selected size of a finger opening is not a limitation of the invention. Any suitable size may be selected according to the intended user. For instance, smaller sizes may be selected to fit the hands of children, men's sizes may be larger than women's sizes, and so on.

The band 110 of this embodiment further includes a generally flat base section 130 and contiguous curved side sections 112A, 112B. In this context the term generally flat is meant to indicate that the shape of the base section 130 renders it mateable with a bar magnet, which is available commercially as rectangular bar. Accordingly, the term generally flat allows for curvatures in the base section 130 that do not interfere with the mating of the base section 130 with a bar magnet. A generally flat base section may even define one or more curves that are complementary to curvatures of the magnet. For instance, in certain embodiments having flexible bands, such as that shown in FIG. 7, it may be advantageous for the base section to include a curvature that roughly matches the curvature of the intended user's finger or fingers. Such curvatures are intended to be within the meaning of "generally flat".

With particular regard to the embodiment shown in FIG. 1, the base section 130 is disposed between two curved side sections 112A, 112B. Therefore, the base section 130 of this embodiment is the portion of the band 110 that excludes the curvatures defining the curved side sections 112A, 112B. As will be discussed in more detail herein, a generally flat base section 130 includes a magnet (see FIG. 2 structure 230) that is co-operably opposable to a similarly flat, generally planar, opposing magnetic or paramagnetic surface (not shown), also referred to herein as a countermember (see FIG. 4 structure 410). The term co-operably opposable means the magnet 230 and countermember 410 can engage in attractive magnetic communication suitable for holding the band 110 in a fixed relation to the countermember 410 and any mobile electronic device, or device case, to which the counter member is attached or embedded.

An embedded magnet may be covered by the base section 130, thus being disposed within the band 110, or the magnet may be recessed into, and may sit flush with, the band 110 thus being exposed. In another embodiment, the magnet may be recessed into, and sit flush with, the band 110, but the band 110 and magnet may share a common coating thus masking the fact that two dissimilar materials make up the base section 130. The common coating may be, for instance and without limitation, electroplating or a polymer coating such as a paint, an enamel, or a rubber coating.

Figure 2:
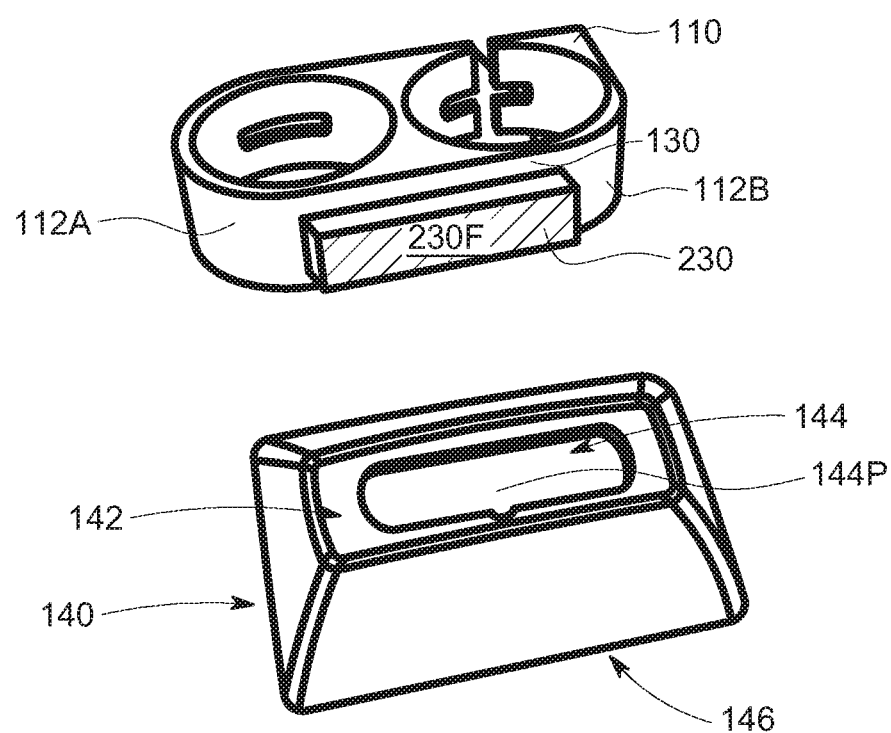
FIG. 2 is an alternative view of the band and stand of FIG. 1.

Turning to FIG. 2, the band 110 of FIG. 1 is shown separated from the stand 140. The generally flat base section 130 is more clearly visible as is the bar magnet 230, which is shown with a major face 230F of the magnet exposed and facing outward, away from the band 110. An opposing major face of the magnet 230 is not visible and is affixed to the band 110. In this embodiment, the magnet 230 is a ferromagnetic neodymium bar; however, the person having ordinary skill in the art will readily appreciated that many suitable alternatives are known in the art. As shown in FIG. 2, the base section 130 and the bar magnet 230 are both generally flat, thus making them mateable with each other. More specifically, the neodymium bar magnet 230 is bonded to the steel band 110 according to known means. For instance, and without limitation, it is known to use curable polymer adhesives such as epoxies, cyanoacrylates, urethanes, and silicones for bonding neodymium magnets.

Figure 9A:
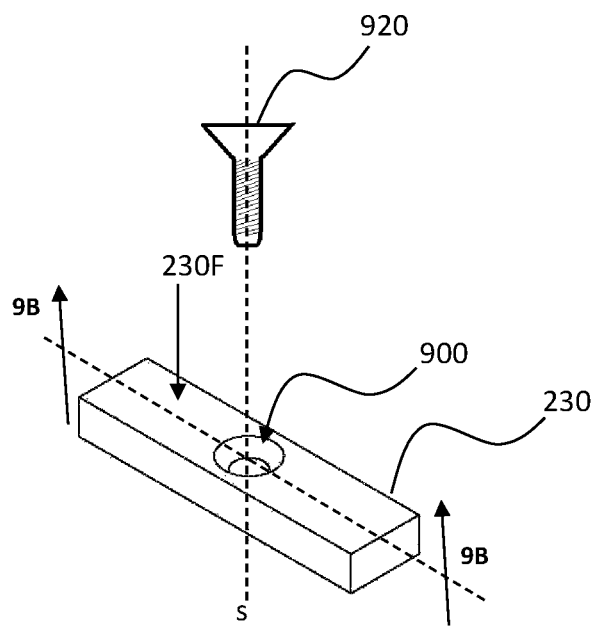
FIG. 9A is a perspective view of a bar magnet with a countersunk screw hole according to one embodiment.
Figure 9B:
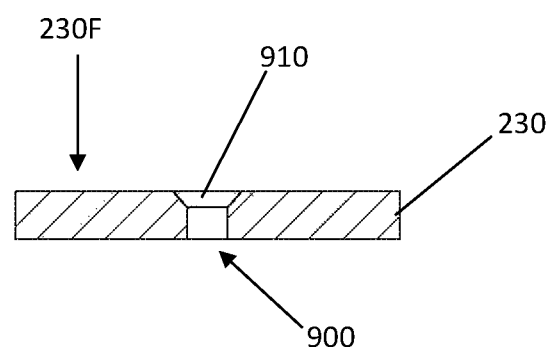
FIG. 9B is a cross sectional view of the bar magnet of FIG. 9A taken along line 9B-9B.

Alternatively, the bar magnet 230 may be fastened to the band 110, for example and without limitation, with a machine screw or other well-known fastener. A magnet 230 specifically adapted to receive a screw is shown in FIGS. 9A and 9B. FIG. 9A is a perspective view of a bar magnet 230 including a countersunk 910 screw hole 900. The countersink 910 allows a screw head 920 to be flush with the surface 230F of the magnet 230. FIG. 9B shows the magnet 230 in cross section, clearly illustrating the countersink 910 and screw hole 900. According to embodiments where the bar magnet 230 is fastened to the band 110, the band may include female threads to receive, for instance, a machine screw. However, embodiments may instead use self-taping screws which may cooperate with a pilot hole in the band 110 to fasten the bar magnet 230. A structure similar to the countersunk 910 screw hole 900 shown in FIGS. 9A and 9B may be adapted to the countermember 410 as will be described in more detail in relation to FIG. 4.

With regard to the stand 140, the embodiment of FIG. 2 includes a broad and generally flat bottom section 146 providing a stable base, and a narrower top section 142. Together the top section 142 and bottom section 146 define a generally rectangular-pyramidal shape; however, the person having ordinary skill in the art will readily appreciate that this is not a requirement of the invention and that many other suitable shapes could be adopted as a matter of design choice. The top section 142 further includes a stand recess 144 shaped complementary to the base section 130 of the band 110 such that the recess 144 receives the base section 130 in a fixed orientation. For instance, since the base section 130 of the illustrated embodiment includes a generally flat rectangular bar magnet 230 bonded to the base section 130, without being recessed therein, the stand recess 144 is shaped to receive the bar magnet 230 to the exclusion of the rest of the base section 130.

Comparing FIG. 1 and FIG. 2 the stand recess 144 of the illustrated embodiment is fitted to the perimeter of the bar magnet 230 and does not receive the generally flat base section 130. Moreover, the depth of the stand recess 144 may or may not be such that the bar magnet 230 sits flush with the top section 142 of the stand. Alternatively, the invention further includes embodiments where the stand recess 144 is shaped to receive both the magnet 230 and the base section 130, and optionally even part of the curved side sections 112A, 112B. In other words, the stand recess 144 may have a stepped structure wherein a deeper section of the recess 144 has a smaller perimeter to receive the raised bar magnet 230, and a shallower section of the recess 144 has a larger perimeter to receive the base section 130.

In a related embodiment, where the magnet 230 is embedded in the base section 130 of the band 110, the stand recess 144 may be shaped to receive the base section 130 without any additional structure for receiving a raised bar magnet 230. In each of the foregoing embodiments, the stand recess 144 is sized to fit portions of the band and/or magnet 230 such that the recess 144 holds the band 110 in a fixed orientation relative to the stand 140. Optionally, the stand may include a paramagnetic member in the stand recess 144 to hold the band 110 in place. For example the recess 144 may have a metal plate 144P forming the bottom of the recess 144. Additionally or alternatively, the band 110 may be fitted to the stand recess 144 in a transition fit to hold the band 110 in a fixed relation to the stand 140 while still allowing the user to easily remove the band 110 from the stand 140.

Figure 3:
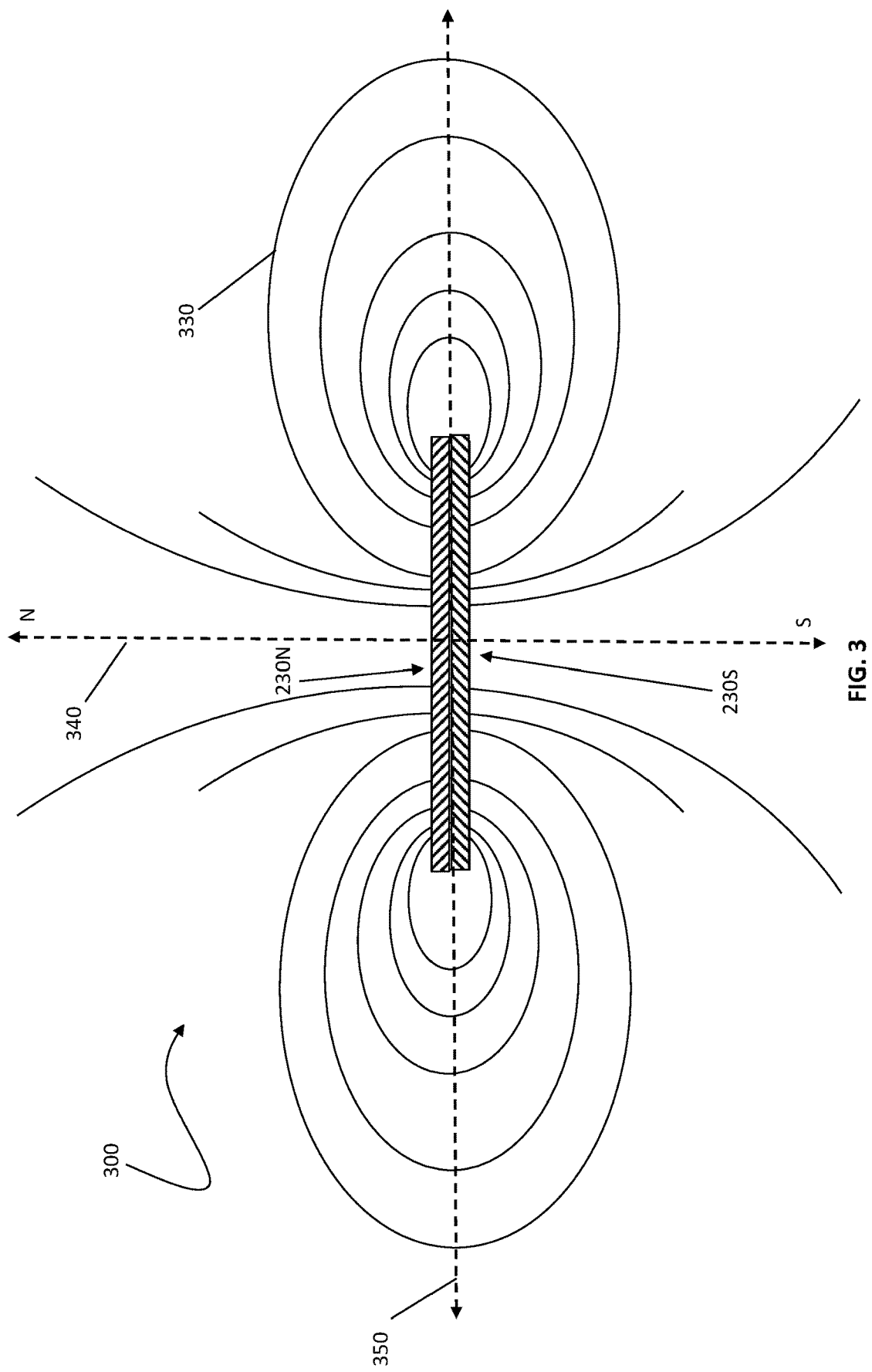
FIG. 3 is an illustration of an axially magnetized bar magnet.

Turning to FIG. 3, an axially magnetized bar magnet 300 is shown which is similar to the bar magnet illustrated in FIG. 2 as reference numeral 230. The magnet 300 has one major surface comprising a north pole surface 230N and a another major surface comprising a south pole surface 230S. The north and south poles of the magnet are shown in opposing hatched-line fill to distinguish them from each other. Magnetic field lines 330 are shown emanating from the magnet 300 symmetrically about a north/south axis 340. The field can be divided by line 350 in to a north field and a south field. Thus, the magnet 300 is axially magnetized. In incorporating an axially magnetized ferromagnet 300 into an embodiment as bar magnet 230, either the north pole surface 230N or the south pole surface 230S may face the outward, and may thus be available for magnetic communication with a countermember such as an opposing ferromagnetic or paramagnetic body.

Figure 4:
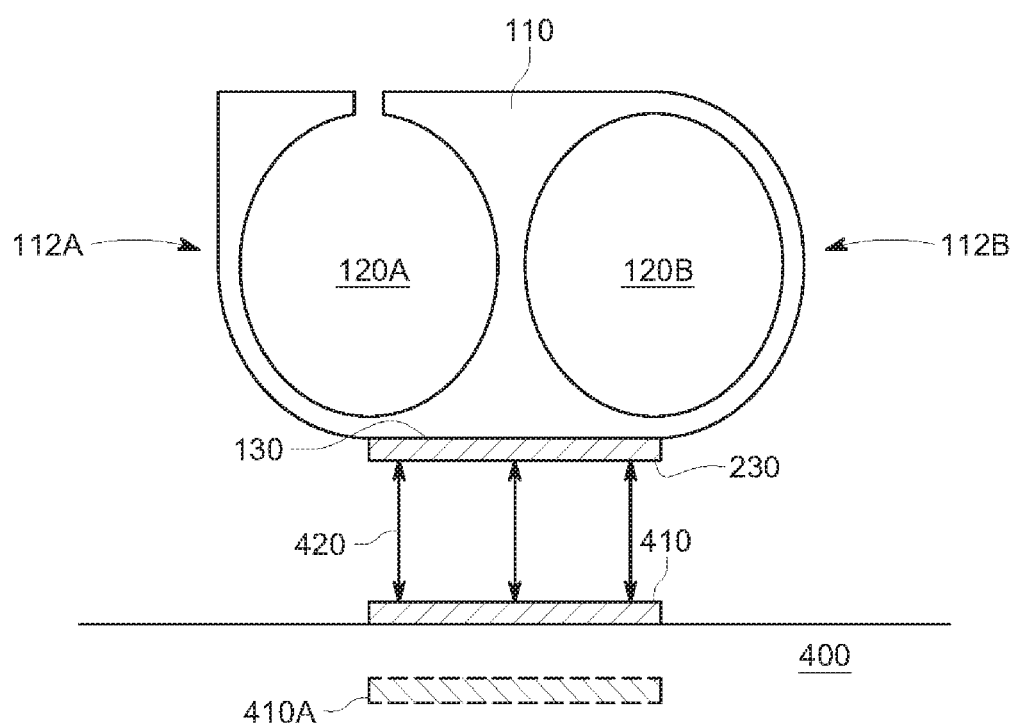
FIG. 4 is an illustration of an embodiment having two finger openings.

FIG. 4 illustrates a band 110 having a bar magnet 230 mounted to the generally flat base section 130. The magnet 230 is in magnetic communication 420 with a generally planar countermember 410. Either the north or south pole of the axially magnetized bar magnet 230 may be facing the countermember 410. The countermember 410 may be either a paramagnetic body or a ferromagnetic body. It will be understood that in embodiments having a paramagnetic countermember, the orientation of the countermember is not critical. It will be further understood that ferromagnetic bodies are also referred to commonly as permanent magnets.

In contrast, in embodiments where the countermember 410 is ferromagnetic the countermember 410 is co-operably opposed to the bar magnet 230 when opposite poles of the counterpart 410 and bar magnet 230 are in attractive magnetic communication, meaning the poles are generally parallel to and opposing each other, and the magnet 230 and countermember 410 are sufficiently close to experience a magnetic force capable of holding in fixed relation the magnet 230, countermember 410, and any device 400 to which the countermember is affixed or embedded. Accordingly, opposite poles of the bar magnet and countermember 410 are oriented toward each other in the embodiment illustrated in FIG. 4, and the lines of force 420 between the bar magnet 230 and the countermember 410 are attractive. As further shown in FIG. 4, the countermember 410 is axially magnetized because its poles are oriented perpendicular to its major surfaces.

FIG. 4 illustrates an embodiment where the countermember 410 is mounted to a surface 400, such as the back surface of a mobile electronic device or a case for such a device. However, embodiments may also embed the countermember 410 in a wall of a mobile device's case, for example a rear wall. By way of illustration, the structure labeled reference numeral 410A in FIG. 4 is the countermember 410 located in an alternative position, namely embedded in surface 400. In some embodiments no countermember 410 may be required because the mobile electronic device or device case may have paramagnetic properties suitable for serving as the countermember.

The person having ordinary skill in the art will appreciate that any of a wide variety of means for mounting the countermember 410 to the surface 400 are acceptable and within the scope of the invention. For instance, one may fasten the countermember to the surface 400 according to well-knowns means, such as with screws. The skilled artisan will appreciate that a wide variety of fasteners may be appropriate, but in particular the counter member 410 may include a countersink to receive a machine screw such that the head of the screw sits flush with the surface of the counter member 410. According to embodiments incorporating screws for fastening the counter member 410 to the surface 400, the surface 400 may include a female thread for receiving the machine screw. Alternatively, a self-tapping screw such as a sheet metal screw or wood screw may be used thereby removing the need for a female thread.

Rather than a fastener, countermember 410 may be bonded to the surface 400 using the curable adhesives described elsewhere herein. In addition to these adhesives, the countermember 410 may be bonded using a pressure sensitive adhesive, which may result in a permanent installation or a repositionable installation of the countermember 410. In embodiments incorporating pressure sensitive adhesives, the countermember 410 may be provided in a free and unbonded state with a layer of pressure sensitive adhesive deposited on one face of the countermember 410. Moreover, it will be understood by the skilled artisan that it is advantageous to also apply a release layer, covering the pressure sensitive adhesive layer, which can be removed at the time the countermember 410 is to be installed on a surface 400.

Figure 5:
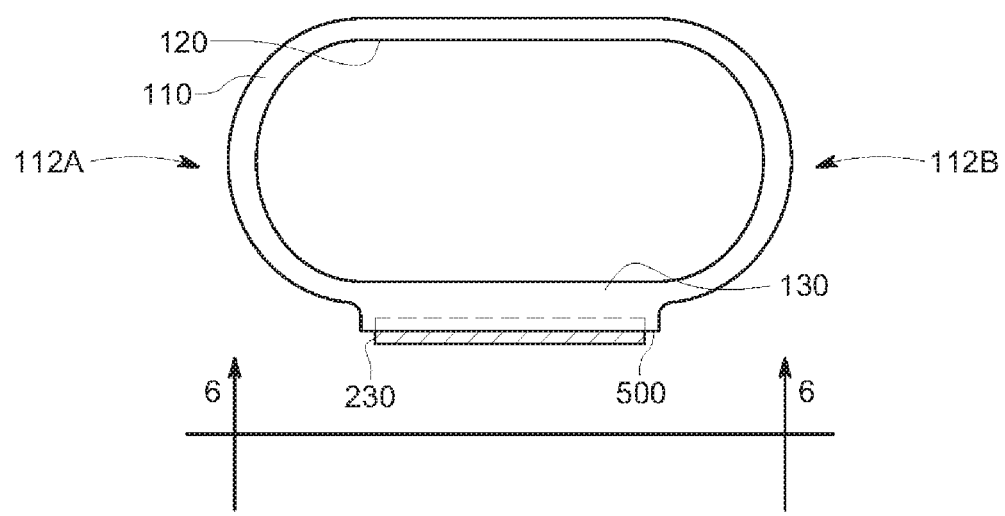
FIG. 5 is an illustration of an embodiment having one opening for simultaneously receiving a plurality of fingers.

FIG. 5 illustrates an embodiment sized to receive up to two adult human fingers in a single finger opening 120. The embodiment includes a band 110 having a generally flat base section 130 receiving a bar magnet 230. According to FIG. 5 the embodiment includes a recess 500 for receiving the bar magnet 230. The band 110 also includes curved side sections 112A, 112B contiguous with the base section 130. The band 110 illustrated embodiment may be a loop fabricated from rigid materials such as metals or resins; however, semi-rigid materials such as and without limitation elastomeric silicones, styrene-butadiene rubbers, and other known materials. Thus, the band 110 may be a rigid loop or a semi-rigid loop. Moreover, as discussed later herein in relation to FIG. 7, the band 110 may also be a flexible loop.

Figure 6:
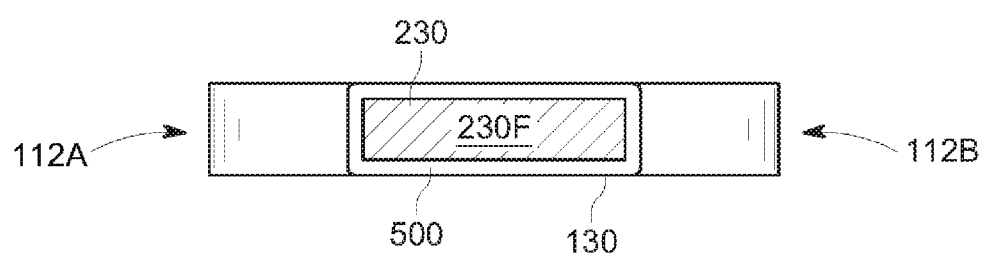
FIG. 6 is a view of the embodiment of FIG. 5 taken along line 6-6.

FIG. 6 is an alternative view of the embodiment illustrated in FIG. 5 from the perspective indicated by line 6-6. The walls of the recess 500 are shown surrounding the bar magnet 230. The bar magnet 230 may be affixed to the base section 130 according to known means as described elsewhere herein, namely by bonding. However, the bar magnet 230 may be additionally or alternatively affixed through an interference fit between the walls of the recess 500 and the bar magnet 230. A major face 230F of the bar magnet 230 is shown facing outward, away from the band 110. An opposing major face (not visible) faces toward the band and may be coated with an adhesive through which the magnet 230 is bonded to the recess 500.

Figure 7:
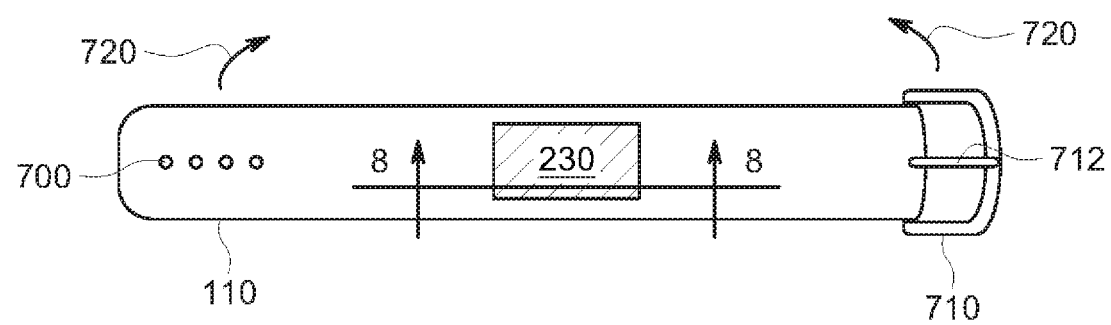
FIG. 7 is a plan view of an embodiment having a flexible band and closure.

FIG. 7 illustrates an embodiment having an adjustable band 110 with a buckle 710 and adjustment holes 700 that cooperate with the tongue 712 of the buckle 710. The ends of the band 110 can be brought together 720 to effect closure of the band 110 using the buckle. Accordingly, this embodiment can be selectively adjusted to certain fixed sizes to receive no more than one, two, three, or four fingers. The person having ordinary skill in the art will readily understand that a wide variety of closures are available for a flexible band, as are known in the field of wrist watches. Moreover, suitable bands can include stretch bands similar to those used in wrist watches, which typically include a plurality of metal panels connected with springs.

Figure 8:
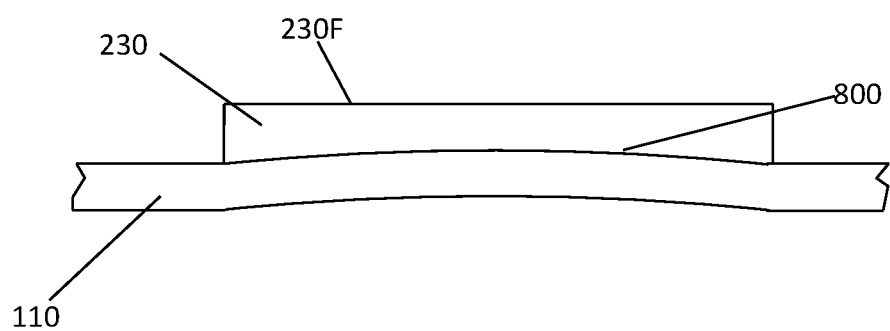
FIG. 8 is a partial cross-sectional view of the embodiment of FIG. 7 taken along line 8-8.

FIG. 8 is a partial cross-sectional view of the embodiment illustrated in FIG. 7 taken along line 8-8. The flexible band 110 is shown with a permanent magnet 230 affixed thereto. The magnet 230 includes one generally flat major face 230F having no curvature. However, the magnet has a second major face 800 with a slight concave curvature. Since the magnet 230 is bonded to the flexible band 110, the band conforms to the curvature of the second major face 800. Such a curvature may be advantageous for providing a band that better conforms to a user's finger(s).

It will be apparent to those skilled in the art that the above methods and apparatuses may be changed or modified without departing from the general scope of the invention. The invention is intended to include all such modifications and alterations insofar as they come within the scope of the appended claims or the equivalents thereof.

I claim:

1. A finger grip for a mobile electronic device, comprising:
 a band configured to receive at least one adult human finger; and
 a generally flat base section of the band including a first permanent magnet member, the first permanent magnet member being axially magnetized, wherein the base section further comprises a recess to receive the first permanent magnet.

2. A finger grip for a mobile electronic device, comprising:
 a band configured to receive at least one adult human finger; and
 a generally flat base section of the band including a first permanent magnet member, the first permanent magnet member being axially magnetized;
 a generally planar countermember mechanically free from the band and from the first permanent magnet, wherein the countermember is either paramagnetic or ferromagnetic and co-operably opposable with the first permanent magnet, wherein the countermember includes a countersunk screw hole co-operable with a screw to fasten the countermember to a surface, wherein a head of the screw is flush with a major face of the countermember.

* * * * *